(12) United States Patent
Stark et al.

(10) Patent No.: US 8,638,019 B2
(45) Date of Patent: Jan. 28, 2014

(54) ELECTRIC MOTOR

(75) Inventors: Tobias Stark, Ostringen (DE); Domenik Hettel, Au am Rhein (DE)

(73) Assignee: Sew-Eurodrive GmbH & Co. KG, Bruchsal (DE)

(*) Notice: Subject to any disclaimer, the term of this patent is extended or adjusted under 35 U.S.C. 154(b) by 286 days.

(21) Appl. No.: 13/054,686

(22) PCT Filed: Jun. 18, 2009

(86) PCT No.: PCT/EP2009/004430
§ 371 (c)(1),
(2), (4) Date: Jan. 18, 2011

(87) PCT Pub. No.: WO2010/006679
PCT Pub. Date: Jan. 21, 2010

(65) Prior Publication Data
US 2011/0115317 A1    May 19, 2011

(30) Foreign Application Priority Data

Jul. 17, 2008  (DE) .......................... 10 2008 033 604

(51) Int. Cl.
*H02K 1/00*   (2006.01)

(52) U.S. Cl.
USPC ........................................... 310/194; 310/71

(58) Field of Classification Search
USPC ................................... 310/71, 194, 260, 270
See application file for complete search history.

(56) References Cited

U.S. PATENT DOCUMENTS

| 4,350,914 | A  | * | 9/1982  | Searle ........................... 310/194 |
| 6,400,059 | B1 |   | 6/2002  | Hsu |
| 6,744,166 | B2 | * | 6/2004  | Harter et al. .................. 310/214 |
| 7,291,955 | B2 | * | 11/2007 | Otsuji ........................... 310/194 |
| 7,732,968 | B2 | * | 6/2010  | Zimmer et al. ............... 310/194 |
| 2002/0084716 | A1 |   | 7/2002  | Harter et al. |
| 2007/0279178 | A1 | * | 12/2007 | Zimmer et al. ............... 336/208 |
| 2008/0030085 | A1 | * | 2/2008  | Gizaw et al. .................... 310/54 |
| 2009/0134742 | A1 |   | 5/2009  | Rhode |

FOREIGN PATENT DOCUMENTS

| DE | 10 2005 051 506 | 5/2007  |
| DE | 10 2006 021 903 | 11/2007 |
| EP |      1 883 145  | 1/2008  |
| WO |   2007/048567   | 5/2007  |

OTHER PUBLICATIONS

International Preliminary Report on Patentability, issued in corresponding International Application No. PCT/EP2009/004430.
International Search Report and Written Opinion, issued in corresponding International Application No. PCT/EP2009/004430.

* cited by examiner

*Primary Examiner* — Dang Le
(74) *Attorney, Agent, or Firm* — Kenyon & Kenyon LLP

(57) ABSTRACT

An electric motor includes a stator made up of individual segments disposed in the circumferential direction, each individual segment including a core stack around which a winding is provided and at whose axial terminal regions end caps are provided, the winding being produced by a winding wire, an end cap including at least one dome, in particular for delimiting the region of the winding, a wire inlet duct for rerouting the winding wire being provided in the base region of the dome, grooves being provided on the end cap, the distance of one groove with respect to the radially following groove and the diameter of the curvature of the respective groove being smaller than the diameter of the winding wire.

12 Claims, 8 Drawing Sheets

ELECTRIC MOTOR

FIELD OF THE INVENTION

The present invention relates to an electric motor.

BACKGROUND INFORMATION

Electric motors, whose stator includes a core stack, are generally known. Such a core stack is preferably stamp-packed.

SUMMARY

Example embodiments of the present invention simplify the production of an electric motor and improve the production quality during the manufacture.

Among features of example embodiments of the present invention in the electric motor are that the electric motor includes a stator which is composed of individual segments disposed in the circumferential direction, each individual segment including a core stack around which a winding is provided and at whose axial terminal regions end caps are situated, the winding being produced by a winding wire, an end cap including at least one dome, in particular for delimiting the region of the winding, and a wire inlet duct for rerouting the winding wire being provided in the base region of the dome, grooves being provided on the end cap, the distance of a groove with respect to the radially following groove and the diameter of the curvature of the respective groove being smaller than the diameter of the winding wire.

In this context it is advantageous that the end cap provides protection of the core stack. Furthermore, the coherence of the core stack is improved. In addition, the shape of the end cap defines and guides the winding as precisely as possible during its production. Thus, spatial path deviations of the winding tool such as pin winders are able to be compensated, thereby always producing the same winding; in other words, the reproducibility of a desired winding is improved, in particular, and/or the winding speed is able to be increased since greater path deviations are acceptable. A number of shaping features of the end cap contribute to the definition and guidance. First of all, the dome restricts the overall space region of the winding. In addition, the rerouting takes place in a defined area at the base of the dome. Moreover, the grooves ensure that no radial sliding has to be taken into account. The groove distance is so small the same winding is always produced given proper path guidance. But even at greater path speeds of the winding tool and thus greater path deviations, a substantially identical winding is able to be produced in that, despite the fact that the first winding of the coil slides by the distance of one groove in the radial direction, the winding then has an identical form again. Since the distance of the grooves is considerably smaller than the diameter of the winding wire, even the position of the winding wire that has shifted by the distance of one groove leads to a substantially identical winding.

Furthermore, it is advantageous that there are shaping features at the end cap which make it possible to hold the individual segments together and to align them with the aid of a retaining element.

In example embodiments, the first layer of the winding of the individual segment is provided on the surface region of the end cap provided with grooves. In this context it is advantageous that a precise alignment winding is possible using the grooves.

In example embodiments, a detent is provided on the end cap, which cooperates with a snap-in region on the retaining ring. In this context it is advantageous that the retaining ring allows the individual segments to be set up in a circle, especially even prior to sliding the stator into the motor housing.

In example embodiments, the retaining ring is made from plastic, which retains the individual segments in a circular pattern, in particular. In this context it is advantageous that the plastic, which is much softer than the core stack, may be used to protect the edges of the core stack.

In example embodiments, the stator having the retaining ring is inserted into a recess of the motor housing. In this context it is advantageous that the circular placement of the individual segments is able to be brought about at least partially via the recess in the finished electric motor.

In example embodiments, radially projecting regions of the retaining ring are provided as lubricant during the insertion into the recess. In this context it is advantageous that the retaining ring functions as lubricant reservoir so to speak, in order to make it possible to provide lubricant during the insertion process.

In example embodiments, the core stacks of the individual segments are interconnected with form locking, in particular with form locking in the radial and in the circumferential directions. In this context it is advantageous that the stator is able to be held together.

In example embodiments, the core stacks of the individual segments are interconnected in form-fitting manner with the aid of a spring-groove connection. It is advantageous that a simple and reliable connection is able to be used, in particular also a connection that is able to be implemented without play.

In example embodiments, the distance of one groove to the radially next groove and the diameter of the curvature of the individual groove is less than one half of the diameter of the winding wire. More specifically, the distance amounts to one third of the diameter of a winding wire or less. In this context it is advantageous that a reproducible winding is able to be produced very rapidly using a pin winder.

In example embodiments, the end cap provided in the first axial terminal region of the individual segment, and the end cap provided in the second axial terminal region of the individual segment are connected by at least two connecting bars or by at least one connecting bar which is at least ten times broader in the radial direction than in the circumferential direction, the connecting bar(s) being provided in one or a plurality of corresponding recesses of the core stack. In this context it is advantageous that the torsional stiffness of the individual segment is increased once the connecting bars have been fixed in place.

In example embodiments, the end caps and/or the connecting bar(s) is/are produced by extrusion-coating the core stack, that is to say, the end caps and a connecting bar are integrally formed, in particular. It is advantageous in this context that the plastic parts are able to be produced in an uncomplicated manner.

In example embodiments, the end cap has a retention offset, which is provided for the form-locking connection with a tool of the winding machine, especially during the production of the winding. It is advantageous that sliding of the end cap caused by forces that arise during the winding is able to be prevented.

In example embodiments, the motor housing is an aluminum continuous casting component. In this context it is advantageous that motors having different axial lengths are able to be manufactured in a simple manner without any particular additional cost, so that a construction kit of motors having different torques may be manufactured in an uncomplicated manner.

In example embodiments, the winding machine is a type of pin winder. This offers the advantage that complex path courses are able to be completed rapidly during the winding operation.

In example embodiments, the connecting bar has reinforcement ribs extending in the axial direction and/or in the radial direction, in particular bars that project in the circumferential direction. This advantageously improves the torsional rigidity.

Further features, aspects, and advantages of example embodiments of the present invention are described in more detail below.

LIST OF REFERENCE NUMERALS 1 dome of the first end cap
2 wire inlet duct
3 grooves
4 detent
5 retention offset
10 punched-bent component
11 winding surrounded by paper
12 first end cap
13 core stack
30 second end cap
31 recess
50 retaining ring
51 snap-in connection region Example embodiments of present invention will now be explained in greater detail with reference to the Figures.

DETAILED DESCRIPTION

Figure 1:
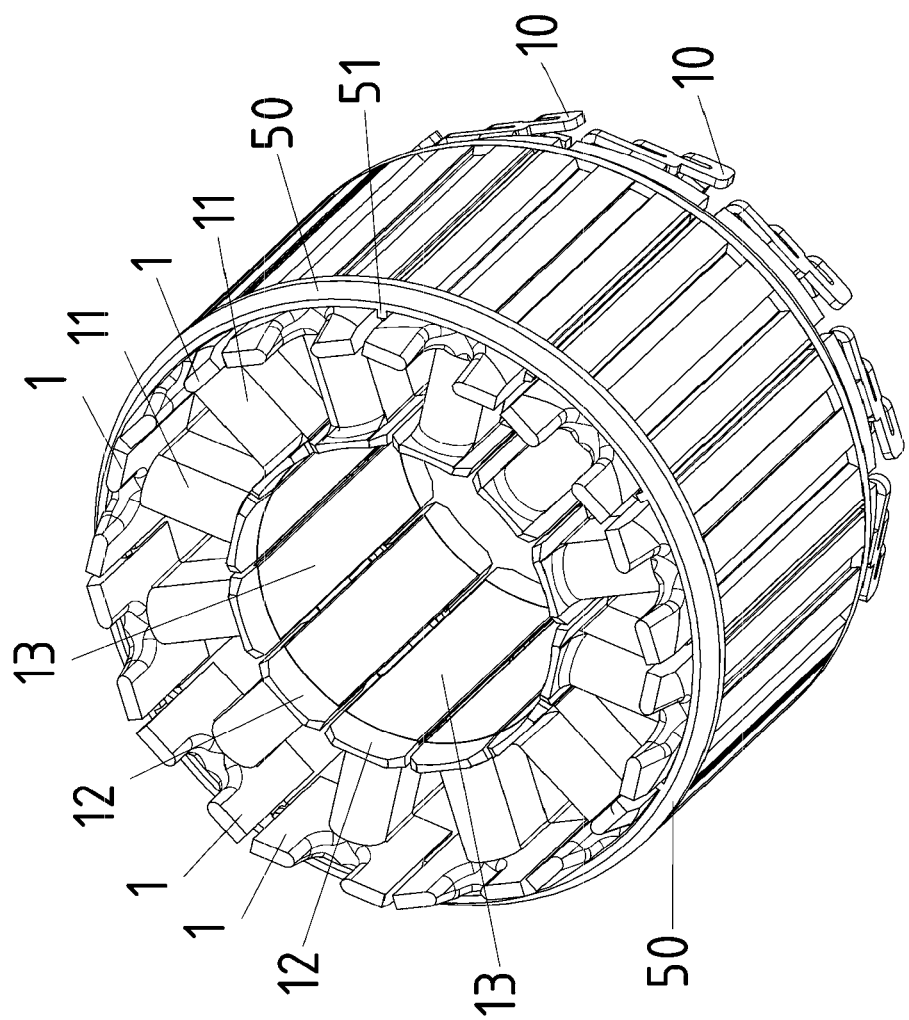
FIG. 1 shows a stator of an electric motor according to an example embodiment of the present invention, which is made up of individual segments held together with the aid of a retaining ring.

As shown in FIG. 1, the stator of the electric motor according to an example embodiment of the present invention is made up of individual segments that are disposed one after the other in the circumferential direction. A retaining ring 50, whose snap-in connection regions 51 keep an individual segment connected with form-fitting, is slipped over the stator, so that the cylindrical form of the stator, i.e., the circular alignment of the individual segments, is achieved.

Each individual segment includes a core stack 13, over which a plastic end cap (12, 30) is slipped at both axial terminal regions. The first end cap is provided axially on the motor output side, and the second end cap is provided axially on the opposite side. The winding of each individual segment is performed automatically, for which purpose a pin winder may be employed.

The end cap (12, 30) is preferably implemented in mirror-symmetry, the mirror plane including the axis of the motor.

The end cap also absorbs the forces produced by the wire tension.

First end cap 12 has domes 1, which are utilized for rerouting the winding wire, and wire inlet ducts 2 are provided at the base of domes 1. These wire inlet ducts bring about an optimal positioning of the first winding of the winding.

All further windings are based on the first winding, that is to say, position themselves relative to the position of the first winding. A high fitting ratio is therefore achievable given optimal positioning of the first winding.

The first layer of windings is deposited on the surface region of the end cap provided with grooves 3. When executing the second layer of windings, which sits on the first layer, axial sliding of the winding wires of the first layer is therefore prevented.

The distance between one groove and the next groove, i.e., transversely to the groove in the radial direction of the electric motor, and the diameter of the curvature of the individual groove are much smaller than the diameter of the winding wire.

Detents 4 arrest retaining ring 50 and a cap produced from the cast of the stator following its production.

The end cap also has a retention offset 5, which is used for fixing the end cap in place on the particular individual segment in form-fitting manner and which is able to be produced by a correspondingly formed workpiece support. Sliding due to forces that arise in the winding operation is thus prevented.

Figure 2:
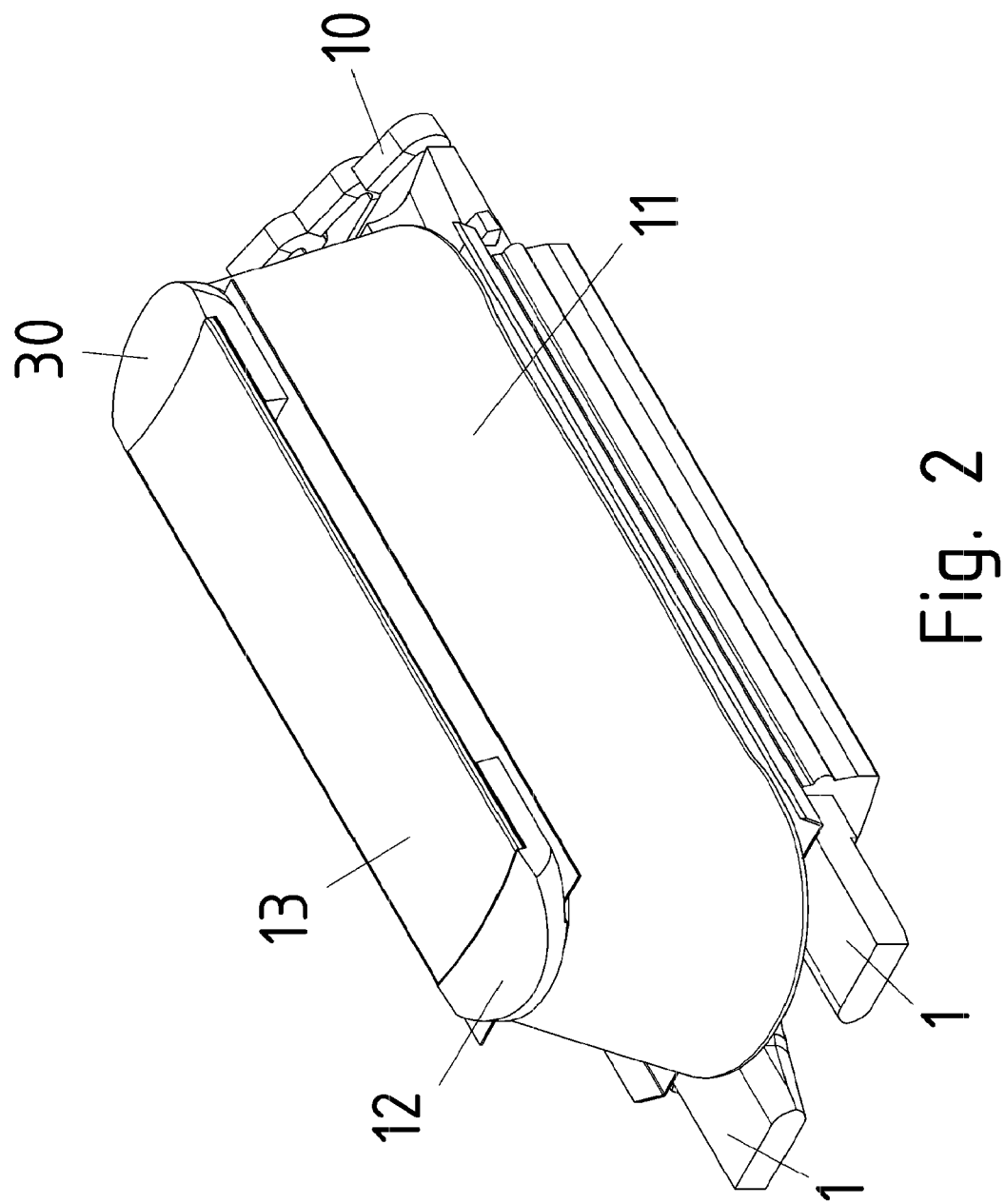
FIG. 2 shows such an individual segment without retaining ring, from a first viewing direction.
Figure 3:
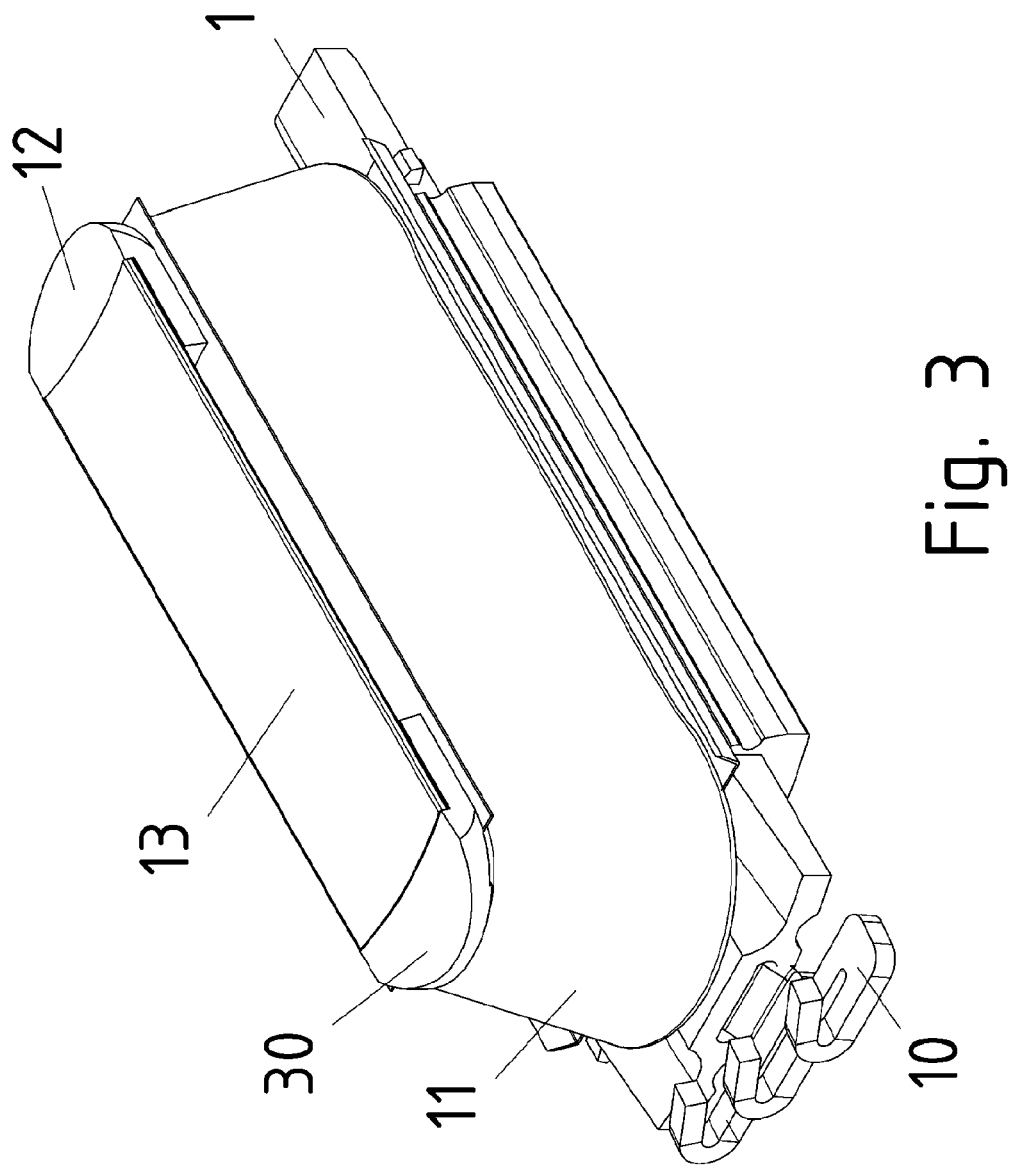
FIG. 3 shows this individual segment from another viewing direction.

FIGS. 2 and 3 show winding 11 for the individual segment, the winding being surrounded by paper. At the axial end, second end cap 12, into whose recess 31 punched-bent part 10 is inserted, is slipped over core stack 13, so that connection wires are able to be electrically connected to the winding wire, which is electrically connected to this punched-bent part 10, especially by soldering or welding.

Figure 4:
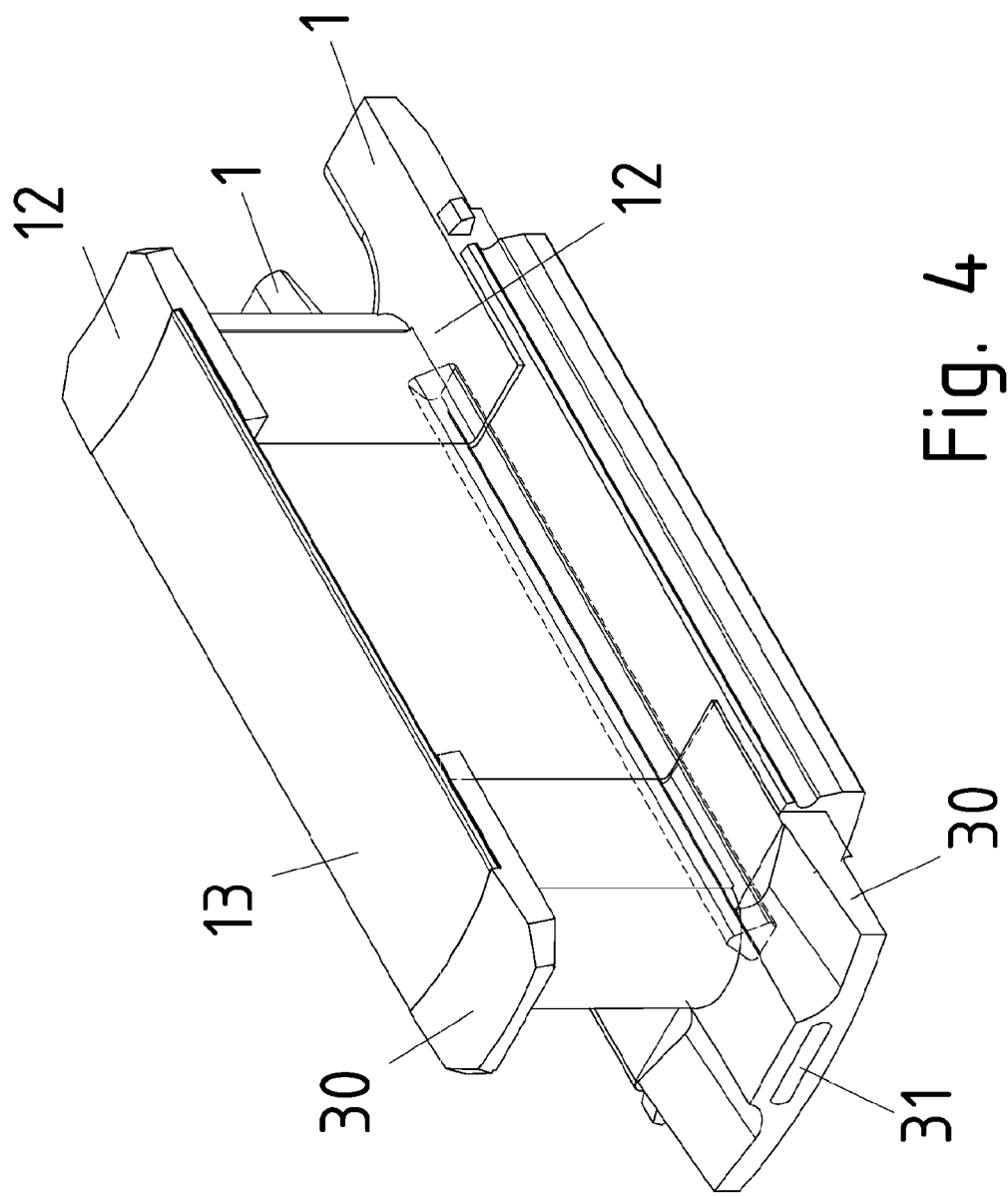
FIG. 4 shows the individual segment without winding.

FIG. 4 shows the unwound individual segment having a first end cap 12 and a second end cap 30, which are slipped over the two axial terminal regions of the individual segment.

FIG. 4 shows the unwound individual segment having a first end cap 12 and a second end cap 30, which are slipped over the two axial terminal regions of the individual segment.

At its end face, i.e., on one of its axial terminal regions, first end cap 30 has a recess 31, into which punched-bent part 10 is inserted and to which winding wires as well as connection wires are welded and soldered for the electrical contacting of the winding.

At punched-bent part 10, in particular the contact hook, at least one end of the winding wire is electrically connected, in particular welded or connected by soldering.

The electrical connections are electrically connected and joined to punched-bent part 10 as well.

Preferably, the contact point of the stranded wire or the winding wire is inserted in punched-bent part 10 and then clamped in by bending punched-bent part 10. Then, a welding connection or some other type of soldered connection is produced between punched-bent part 10 and the stranded wire. In a corresponding manner, the winding wire is also electrically connected to punched-bent part 10.

Second end cap 12 has domes 1, which are used for rerouting and threading the first winding wire, i.e., which act as wire guide during the winding process of the winding.

Figure 5:
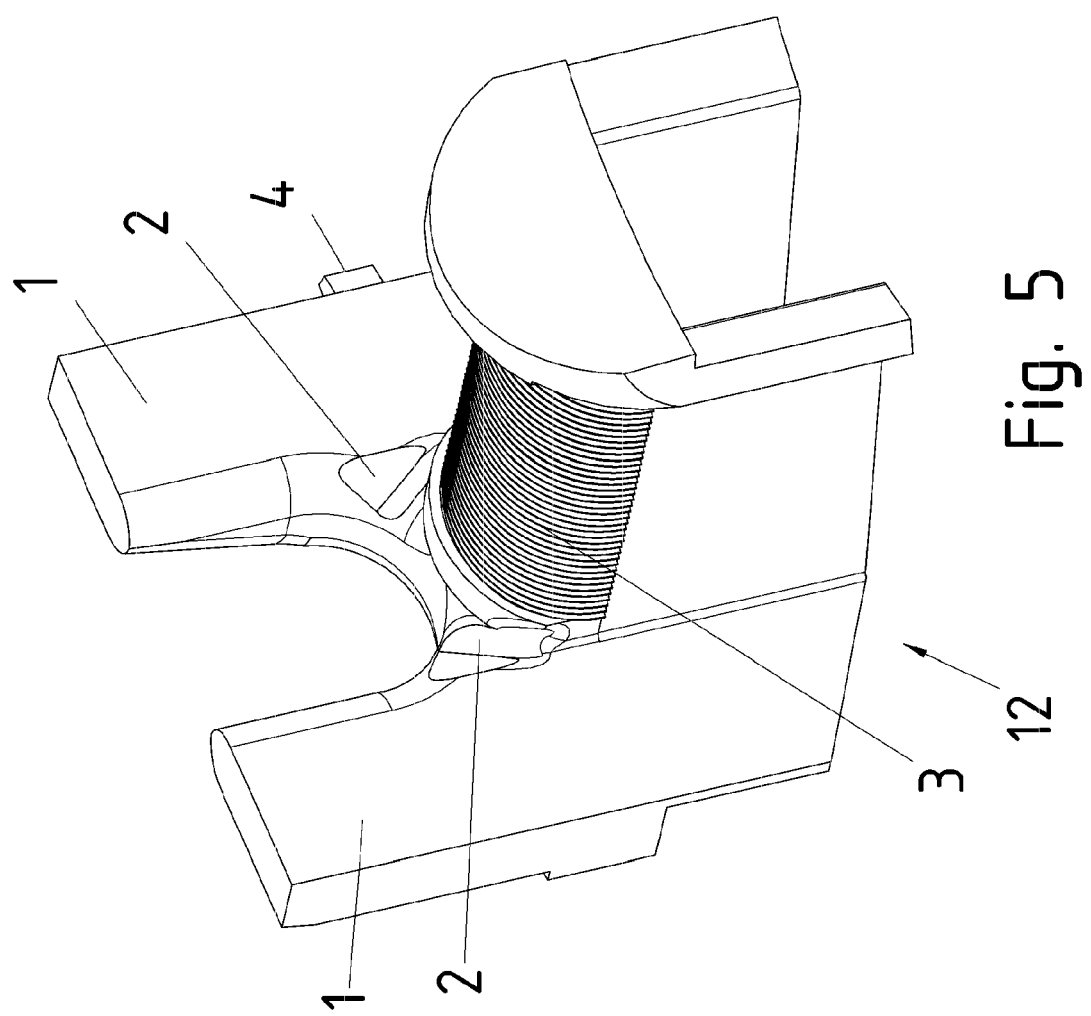
FIG. 5 shows a first end cap for the individual segment, from a first viewing direction.
Figure 6:
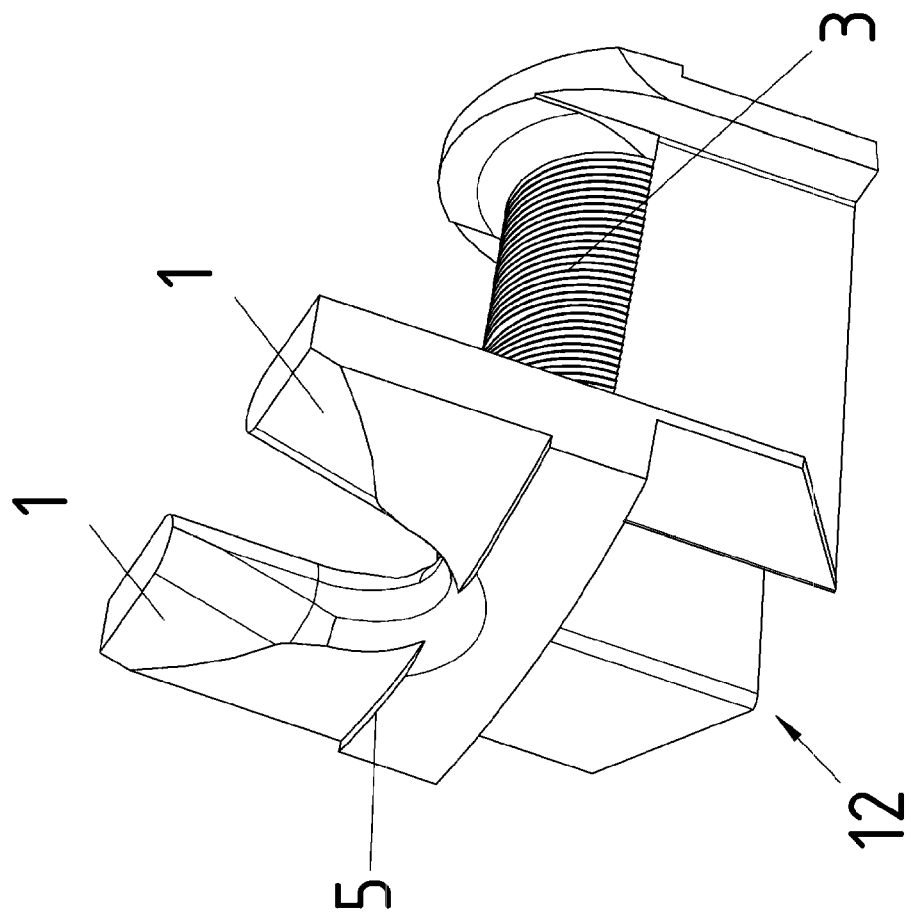
FIG. 6 shows this first end cap from a second viewing direction.

FIG. 5 shows first end cap 12 in an enlarged view, it being clear that domes 1 project beyond the winding region in the radial direction.

Figure 7:
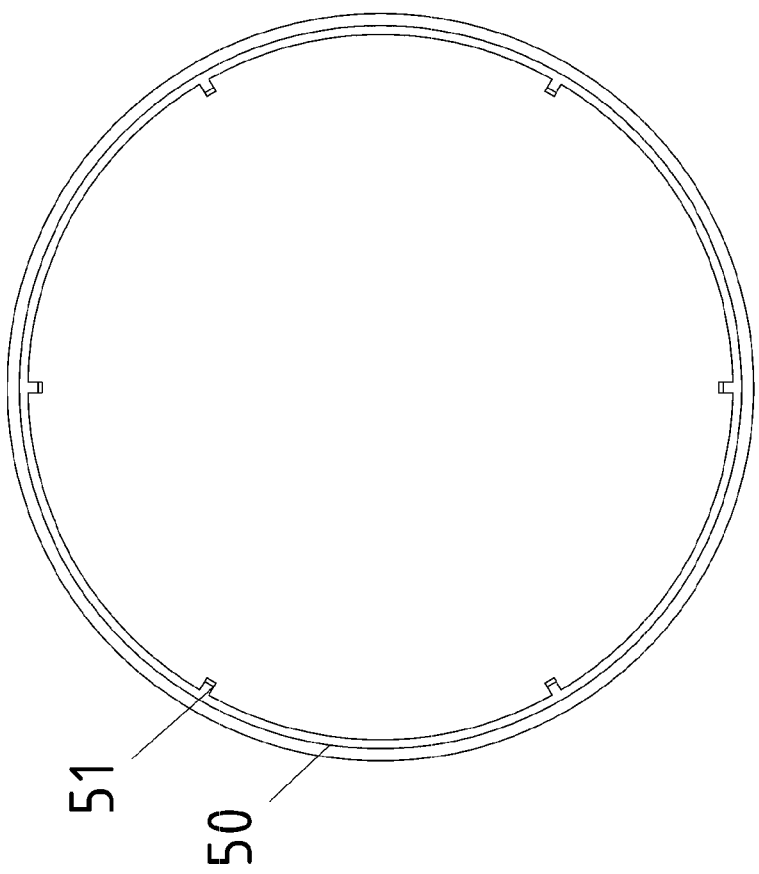
FIG. 7 shows the retaining ring in a plan view.
Figure 8:
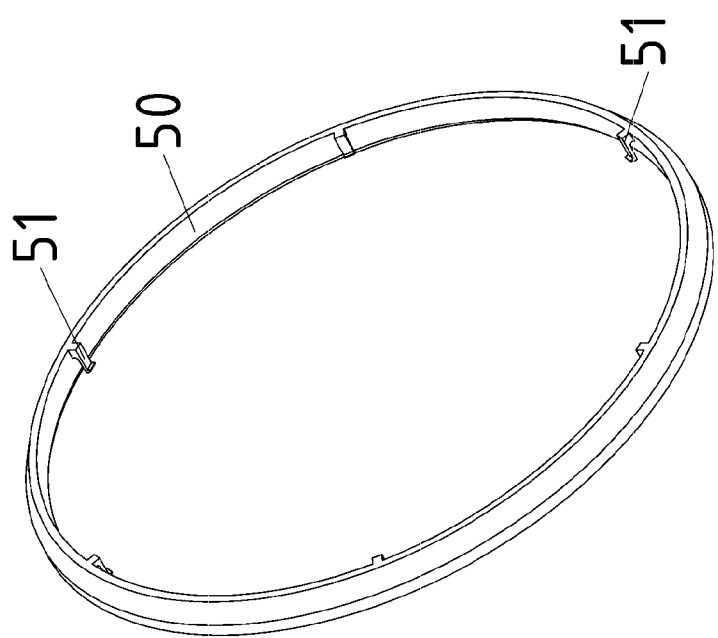
FIG. 8 shows the retaining ring in a perspective view.

In FIG. 7, six snap-in connection regions 51 on retaining ring 50 are visible, which are evenly spaced with respect to each other in the circumferential direction.

Figure 9:
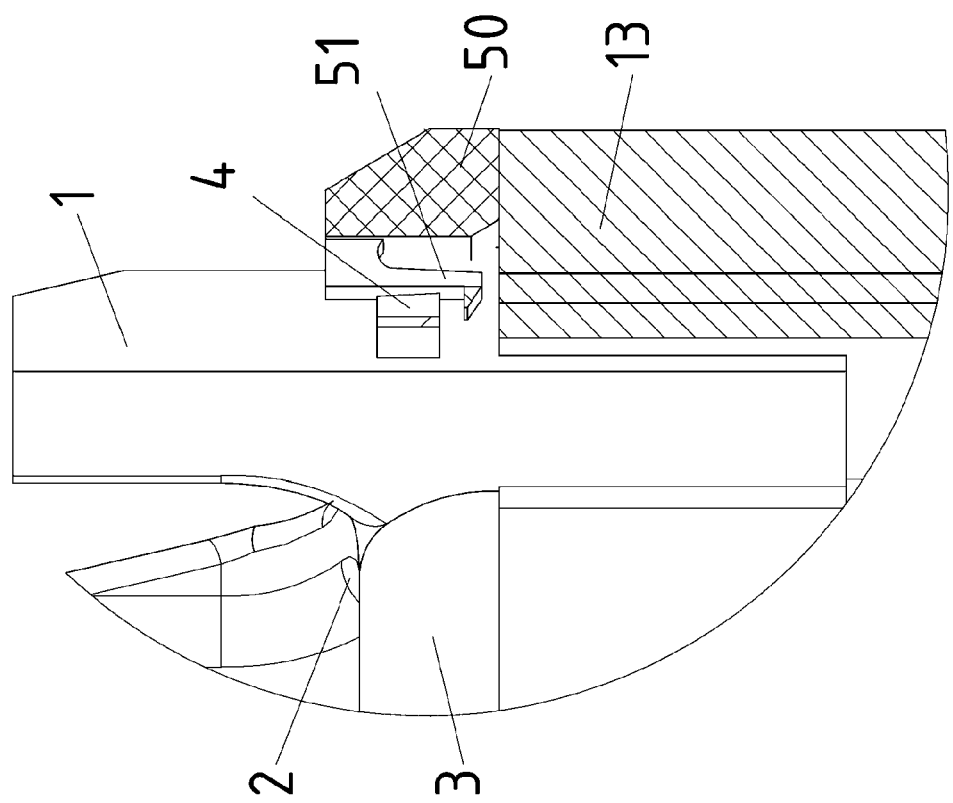
FIG. 9 shows a cross-section through a region of the individual segment.

FIG. 9 shows a cross-section through first end cap 12 with its dome 1 and wire inlet duct 2 as well as detent 4, which retains retaining ring 50 in its snap-in region 51 in form-fitting manner. In FIG. 9, this snap-in region 51 and detent 4 do not touch, but the illustrated clearance is within the manufacturing tolerance range, so that the connection has very low or even no play at all given the multitude of snap-in connections at the circumference of retaining ring 50.

For the production of the electric motor, the stator shown in FIG. 1 is slipped into the hole-shaped recess of a motor housing. The recess is worked as a bore, in particular milled and/or turned. The motor housing is heated for the insertion, which causes the recess to widen and the stator to be held in force-fitting manner once the stator has cooled. The joining temperature is between 150° C. and 300° C.

To facilitate the threading of the stator held together by retaining ring 50, the entire circumference of plastic retaining ring 50 is provided with a chamfer or bevel, which has a radius that increases in the radial direction. The stator therefore is placed next to the recess of the motor housing with the aid of this chamfer, and then slipped in.

While the plastic of retaining ring 50 does not melt yet at the joining temperature, it nevertheless no longer retains its nominal firmness. Thus, the interference allowance of the retaining ring, i.e., regions radially projecting beyond the bore, is pressed together during the insertion operation and is smeared along the outer periphery of the core stack of the stator in the axial direction. This produces a lubricating effect and thus protection of the bore from the sharp edges of the core stack, and a lower frictional force is able to be used during the insertion.

In other words, retaining ring 50 fulfills the function of supporting the individual segments on the one hand, and sections of its material act as lubricant so to speak during the insertion operation, on the other. After the stator has been inserted, it is partially supported by leftover traces of the retaining ring and partially with the aid of the motor housing. An additional support function is achieved by the casting of the stator with casting compound. The support functions of the motor housing by itself it thus insufficient.

Preferably, the motor housing is produced as aluminum continuous casting profile.

The invention claimed is:

1. An electric motor, comprising:
   a stator assembled from individual segments arranged in a circumferential direction, each individual segment including a core stack;
   a winding provided around the core stack, the winding including a winding wire; and
   an end cap arranged at axial terminal regions of the core stack;
   wherein the end cap includes at least one dome, a wire inlet duct adapted to reroute the winding wire provided in a base region of the dome; and
   wherein grooves are provided on the end cap, a distance of a groove with respect to a radially following groove and a diameter of a curvature of the respective groove being smaller than a diameter of the winding wire.

2. The electric motor according to claim 1, wherein the dome delimits a region of the winding.

3. The electric motor according to claim 1, wherein a first layer of the winding of the individual segment is provided on a surface region of the end cap provided with grooves.

4. The electric motor according to claim 1, wherein a detent is provided on the end cap, the detent adapted to cooperate with a snap-in region on a retaining ring.

5. The electric motor according to claim 1, wherein the retaining ring is formed from plastic and is adapted to maintain the individual segments in circular form.

6. The electric motor according to claim 1, wherein the stator together with the retaining ring is arranged in a recess of a motor housing.

7. The electric motor according to claim 1, wherein radially projecting regions of the retaining ring form a lubricant reservoir in order to provide lubricant during an insertion into the recess.

8. The electric motor according to claim 1, wherein the core stacks of the individual segments are interconnected by a retention offset to fix the end cap on a first core stack in a form-fitting manner to a second core stack by at least one of (a) with form locking and (b) with form-locking in radial and circumferential directions.

9. The electric motor according to claim 1, wherein the distance of one groove to the radially next groove and the diameter of the curvature of the individual groove is less than one half of the diameter of the winding wire.

10. The electric motor according to claim 1, wherein the end caps at least one of (a) extrusion-coated on the core stack and (b) are integrally formed with the core stack.

11. The electric motor according to claim 1, wherein the end cap has a retention offset provided for a form-locking connection with a tool of a winding machine adapted to prevent slippage of the end cap as a result of forces occurring during winding.

12. The electric motor according to claim 11, wherein the winding machine is arranged as a pin winder.

* * * * *